(12) United States Patent
Usuki et al.

(10) Patent No.: US 6,740,407 B1
(45) Date of Patent: May 25, 2004

(54) MAGNETIC RECORDING MEDIUM AND MAGNETIC RECORDING MODE USING FLOPPY DISK

(75) Inventors: Kazuyuki Usuki, Odawara (JP); Kazutoshi Katayama, Odawara (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 93 days.

(21) Appl. No.: 09/618,152

(22) Filed: Jul. 17, 2000

(30) Foreign Application Priority Data

Jul. 16, 1999 (JP) .......................................... 11-202767
Sep. 27, 1999 (JP) .......................................... 11-272643
Oct. 22, 1999 (JP) .......................................... 11-301344

(51) Int. Cl.$^7$ ................................................ G11B 5/72
(52) U.S. Cl. .............................. 428/408; 428/694 TC; 428/694 TF
(58) Field of Search .................. 428/408, 694 TC, 428/694 TF

(56) References Cited

U.S. PATENT DOCUMENTS 5,227,211 A * 7/1993 Eltoukhy et al. ........... 428/336
6,136,421 A * 10/2000 Chen ...................... 204/192.16

FOREIGN PATENT DOCUMENTS

JP 08-036744 * 2/1996

* cited by examiner

Primary Examiner—Stevan A. Resan
(74) Attorney, Agent, or Firm—Sughrue Mion, PLLC

(57) ABSTRACT

A magnetic disk, comprising a magnetic layer, a protective layer, and a lubricating layer coated at least on one surface of a flexible non-magnetic support member or a rigid non-magnetic support member, wherein the protective layer comprises a carbon film containing hydrogen, nitrogen, and rare gas elements, nitrogen content is 0.5–8.0 atom %, and rare gas content is 0.5–1.2 atom %, and a magnetic recording mode using a floppy disk, wherein magnetic signal is recorded and reproduced using a floppy disk device provided with a carbon protective layer on the surface of the head or the slider.

1 Claim, 1 Drawing Sheet

MAGNETIC RECORDING MEDIUM AND MAGNETIC RECORDING MODE USING FLOPPY DISK

BACKGROUND OF THE INVENTION

The present invention relates to a magnetic recording medium with high surface recording density, and also to a magnetic recording mode using a large capacity floppy disk providing high reliability for practical use.

In a magnetic recording medium such as magnetic tape, hard disk, etc., a vacuum-deposited tape or a metal thin film type hard disk, etc. are used. Using a ferromagnetic metal thin film prepared by vacuum film forming method, i.e. sputtering method, vacuum evaporation method, etc., this magnetic recording medium is used as a recording layer in practical application. In this type of magnetic recording medium, high magnetic energy can be easily obtained, and flat surface can be easily achieved by smoothening the surface of non-magnetic substrate. In this respect, it is characterized in that spacing loss is low and high electromagnetic transfer characteristics can be attained, and this is suitable for a method to manufacture a high-density recording material. In particular, the sputtering method can increase magnetic energy than the evaporation method, and this is adopted in the magnetic recording medium such as hard disk, which must provide high surface recording density.

On the other hand, compared with the hard disk, a floppy disk type magnetic recording medium has higher impact resistance and can be produced at lower cost, and it is widely used in 2HD class products. Further, in recent years, a high-density magnetic recording medium represented by Zip (Iomega Inc.) based thin layer coating technique has been introduced to practical use. In the magnetic recording medium as described above, recording and reproduction are performed at high speed of about 3000 rpm, and high transfer rate closer to that of hard disk can be achieved. However, its recording density is still less than ½₀ of that of the hard disk. This is attributable to the fact that a floppy disk type magnetic recording medium which has the magnetic layer produced by sputtering method as in case of the hard disk is not yet suitable for practical application.

There are various reasons for this. One of the reasons is that, in the magnetic recording mode using such a floppy disk, it is difficult to maintain high running durability and to attain high reliability for practical use.

In the floppy disk with the magnetic layer produced by the sputtering method, it is more difficult to maintain durability than the floppy disk produced by the conventional coating method. The reason is as follows: The floppy disk produced by the coating method contains hard particles and lubricant in the magnetic layer in addition to magnetic particles and has high lubricating property and high wear resistance. On the other hand, in the floppy disk produced by the sputtering method, the magnetic layer is a metal thin film, which is easily worn out.

For this reason, there have been attempts to form a wear-resistant protective layer on the magnetic layer as in the case of hard disk, and to form a lubricating layer on it in order to provide higher lubricating property and wear resistance. However, even when a protective layer and a lubricating layer similar to the case of the hard disk are formed on the floppy disk, running durability can be improved but it is not possible yet to attain high reliability for practical use. In case of hard disk, when the number of revolutions of disk is increased, the head is floated up by floating force applied on the head, and it is used under the condition that the head and the hard disk are not in contact with each other. In case of floppy disk, even when the number of revolutions of the disk is increased, vibration of the disk (surface deviation) is high, and the head cannot be floated up in stable manner. Even at high-speed rotation,-the head and the floppy disk are frequently in contact with each other.

For this reason, with the purpose of increasing the running durability and of maintaining high reliability for practical use in case of the floppy disk, it is necessary to achieve as follows:

(1) Lubricating layer having high lubricating property;
(2) Protective layer with high wear resistance;
(3) Well-controlled surface roughness not to generate high frictional force even when head and disk are in contact with each other; and
(4) Low surface deviation to reduce frequency of contact. In particular, for the lubricating layer and the protective layer must have higher durability in the contact sliding than those used on hard disk.

As the protective layer with high wear resistance, an amorphous carbon film containing carbon and hydrogen and called "diamond-like carbon" (DLC) is most commonly used. It is used as the protective layer for hard disk or for video tape having metal thin film type magnetic layer and formed by vacuum deposition. Diamond-like carbon can be relatively easily produced. It is hard and has low frictional force and is very unlikely to cause seizure. However, it has been found that, when the commonly used diamond-like carbon containing carbon and hydrogen is used as the protective layer for floppy disk, sufficient durability cannot be obtained. The reason for this is that, when diamond-like carbon is used as a protective layer, frictional force is gradually increased as the head and the disk are repeatedly brought into contact with each other. As a result, the diamond-like carbon may be destroyed or the magnetic layer may be destroyed, and scratches may occur.

To reduce the increase of frictional force, various methods for improvement are proposed such as the improvement of structure of lubricant, adsorbing property between lubricant and protective layer, surface treatment of protective layer, property of protective layer, etc. In order to maintain low frictional force even when lubricant or protective layer is consumed or worn out, it seems to be the most effective way to decrease frictional coefficient of the protective layer itself.

For example, as a method to improve the quality of the protective layer of hard disk, there is a method to add a third element in addition to carbon and hydrogen of the diamond-like carbon. Above all, it is reported that a nitrogen-added diamond-like carbon has an effect to decrease the frictional force. For example, JP-A-7-334830, to JP-A-1-320622, etc. describe the use of a DLC film containing nitrogen as the protective layer.

Further, JP-A-6-333231 discloses the use of a protective layer containing hydrogen and nitrogen and a lubricant layer having polar group. U.S. Pat. No. 5,567,512 (JP-A-8-106629) describes a carbon protective layer having a specific ratio of surface density of nitrogen atoms.

Also, JP-A-9-288818 describes a carbon protective layer containing nitrogen and of 10–20 nm in thickness. JP-A-10-143836 discloses that nitrogen concentration in the carbon protective layer is changed in direction of thickness and a material having a specific chemical structure is used as lubricant. Further, U.S. Pat. No. 5,776,602 teaches a nitrogen-containing carbon protective layer having Raman spectrum of a specific range. EP-54720 describes the use of a carbon protective layer containing hydrogen and nitrogen and with thickness of less than 20 nm.

On the other hand, the magnetic head sliding with the floppy disk is mounted on a slider, which generally controls floating and contact conditions. Like the slider used in the hard disk drive, the slider for the floppy disk is made of ceramics such as $Al_2O_3$—TiC. However, carbon protective layer is not formed on the surface of the slider as in the case of the slider for hard disk drive described in JP-A-8-45045. The reason for this may be as follows: When a conventional thin film coating type floppy disk is used as a magnetic recording medium, even in case high hardness carbon protective layer is provided, this protective layer is worn out within short time due to sliding movement with the floppy disk and the effect is very low.

The surface of the slider of hard disk drive is manufactured in such manner that it is floated stably by air flow generated by the rotation of the disk. Unlike the case of the hard disk, stable floating cannot be attained in case of the floppy disk, and it is designed to maintain very slight contact sliding. Therefore, not only the wearing of the medium but also wearing of head and slider are very important in the evaluation of the reliability of the system. When the head is worn out, it is difficult to record or reproduce the information. If the slider is worn out, powder material generated by wearing enter between the head and the disk, and this may cause reading error when the recorded signal is read, or the floppy disk may be damaged.

The problems of wearing of disk and head as described above are very important to maintain high reliability for practical use in case of magnetic recording mode, which uses a large capacity floppy disk, and has higher recording density compared with the conventional type floppy disk system. In particular, when it is tried to use metal thin film type floppy disk as the floppy disk, it is very difficult to solve these problems. To solve the problems, it is attempted in the present invention to maintain high reliability for practical use in the magnetic recording mode using a floppy disk and providing high recording density using a metal thin film type floppy disk.

Also, it has been found that satisfactory durability cannot be obtained even when the commonly used DLC is used as protective layer for floppy disk. When DLC is used as the protective layer, head and disk are repeatedly brought into contact with each other, and frictional force is gradually increased. As a result, DLC film is destroyed or the magnetic layer is destroyed, and scratches occur.

To reduce the increase of frictional force, various methods for improvement are proposed such as the improvement of structure of lubricant, adsorbing property between lubricant and protective layer, surface treatment of protective layer, property of protective layer, etc. In order to maintain low frictional force even when lubricant or protective layer is consumed or worn out, it seems to be the most effective way to decrease frictional coefficient of the protective layer itself.

However, when nitrogen is added to DLC in the protective layer of floppy disk, friction coefficient is certainly decreased, but running durability is often decreased. This is because, even though friction coefficient is decreased due to the difference in manufacturing conditions and the difference in nitrogen content, hardness is decreased, and satisfactory wear resistance cannot be attained.

Generally, when nitrogen is added to DLC, frictional force is gradually decreased with the increase of the added nitrogen quantity, and hardness is gradually decreased (aggravated). Therefore, in order to maintain sufficient running durability in the severe sliding conditions such as the case of floppy disk, a protective layer must be prepared, which has such composition and structure that satisfactory hardness can coexist or is compatible with friction coefficient. To cope with such problem, it is proposed to coat relatively soft nitrogen-added DLC on a hard DLC, but this requires more complicated manufacturing procedure.

It is an object of the present invention to prepare a protective layer where high hardness and low friction coefficient can coexist and to provide a magnetic recording medium which has satisfactory running durability not only when it is used on a rigid support member such as hard disk but also when it is used under severe sliding condition as in the case of floppy disk.

The problem of wearing of disk and head is very important in case of the magnetic recording mode using a large capacity floppy disk having higher recording density than the conventional type floppy disk system. In particular, when a metal thin film type floppy disk is used as floppy disk, it is very difficult to solve this problem.

In this respect, it is another object of the present invention to provide a magnetic recording medium, which has a protective layer where high hardness and low friction coefficient can coexist and by which high running durability can be attained in case of magnetic disk such as hard disk or floppy disk.

It is aimed to maintain high reliability in practical use in a magnetic recording mode using a floppy disk and providing high recording density using a metal thin film type floppy disk.

SUMMARY OF THE INVENTION

The present invention provides a magnetic disk which comprises a magnetic layer, a protective layer, and a lubricating layer coated at least on one surface of a flexible support member, wherein the protective layer contains at least carbon, hydrogen and nitrogen.

Further, the present invention provides a magnetic disk, which comprises a magnetic layer, a protective layer, and a lubricating layer coated at least on one surface of a flexible support member or a rigid support member, wherein the protective layer contains at least carbon, hydrogen, nitrogen and rare gas elements.

Also, the present invention provides the magnetic disk as described above, wherein nitrogen content of the protective layer is 0.5–8.0 atom %.

Further, the present invention provides the magnetic disk as described above, wherein hydrogen content of the protective layer is 25–35 atom %.

Also, the present invention provides the magnetic disk as described above, wherein carbon content in the protective layer is 60–70 atom %.

Further, the present invention provides the magnetic disk as described above, wherein rare gas content in the protective layer is 0.5–1.2 atom %.

The present invention provides a method for manufacturing a magnetic disk, which comprises the steps of forming a magnetic layer at least on one surface of a flexible support member or a rigid support member, and forming a protective layer on surface of the magnetic layer by plasma CVD method using a mixed gas of hydrocarbon, nitrogen and rare gas elements under application of negative bias voltage on the magnetic layer.

Also, the present invention provides the method for manufacturing a magnetic disk as described above, wherein the magnetic layer is formed by sputtering method.

Further, the present invention provides a magnetic recording mode using a floppy disk, wherein the floppy disk is used as a magnetic recording medium, said floppy disk comprising a ferromagnetic thin film and a carbon protective layer coated at least on one surface of a flexible support member, and a magnetic signal is recorded and reproduced by a floppy disk device with a carbon protective layer provided on surface of a head or a slider.

Also, the present invention provides a magnetic recording mode using a floppy disk as described above, wherein hardness of the carbon protective layer of the floppy disk is lower than hardness of the carbon protective layer on the surface of the head or the slider.

Further, the present invention provides a magnetic recording mode using a floppy disk as described above, wherein micro-hardness of the carbon protective layer of the floppy disk is within the range of 20–40 GPa, micro-hardness of the carbon protective layer on the surface of the head or the slider is 30 GPa or more, and hardness of the carbon protective layer on the floppy disk is lower than hardness of the carbon protective layer on the surface of the head or the slider.

Also, the present invention provides a magnetic recording mode using a floppy disk as described above, wherein a floppy disk is used as a magnetic recording medium, said floppy disk having a ferromagnetic metal thin film at least on one surface of a flexible support member and comprising a carbon protective layer containing at least carbon, hydrogen and nitrogen coated on a ferromagnetic metal thin film, and a magnetic signal is recorded and reproduced by a floppy disk device having a carbon protective layer on the surface of the head or the slider.

Further, the present invention provides a magnetic recording mode using a floppy disk as described above, wherein hydrogen content in the carbon protective layer of the floppy disk is 25–35 atom %, and nitrogen content is 0.5–8.0 atom %

Also, the present invention provides a magnetic recording mode using a floppy disk as described above, wherein the carbon protective layer of the floppy disk contains at least carbon, hydrogen, nitrogen, and rare gas elements.

Further, the present invention provides a magnetic recording mode using a floppy disk as described above, wherein the carbon protective layer of the floppy disk contains at least carbon, hydrogen, nitrogen, and rare gas elements, hydrogen content is 25–35 atom %, nitrogen content is 0.5–8.0 atom %, and rare gas content is 0.5–1.2 atom %

Also, the present invention provides a magnetic recording mode using a floppy disk as described above, wherein micro-hardness of the carbon protective layer of the floppy disk is within the range of 20–40 GPa, micro-hardness of the carbon protective layer on the surface of the head or the slider is 30 GPa or more, and hardness of the carbon protective layer of the floppy disk is lower than hardness of the carbon protective layer on the surface of the head or the slider.

Further, the present invention provides a magnetic recording mode using a floppy disk as described above, wherein the floppy disk is used as a magnetic recording medium, said floppy disk comprising a ferromagnetic metal thin film at least on one surface of a flexible support member and having a carbon protective layer containing at least carbon, hydrogen and nitrogen on the ferromagnetic metal thin film, and a magnetic signal is recorded and reproduced on a floppy disk device having a carbon protective layer containing at least carbon and hydrogen on the surface of the head or the slider.

Also, the present invention provides a magnetic recording mode using a floppy disk as described above, wherein hydrogen content in the carbon protective layer of the floppy disk is 25–35 atom %, and nitrogen content is 0.5–8.0 atom %.

Further, the present invention provides a magnetic recording mode using a floppy disk as described above, wherein the carbon protective layer of the floppy disk contains at least carbon, hydrogen, nitrogen, and rare gas elements.

Also, the present invention provides a magnetic recording mode using a floppy disk as described above, wherein the carbon protective layer of the floppy disk contains at least carbon, hydrogen, nitrogen, and rare gas elements, hydrogen content is 25–35 atom %, nitrogen content is 0.5–8.0 atom %, and rare gas content is 0.5–1.2 atom %.

Further, the present invention provides a magnetic recording mode using a floppy disk as described above, wherein micro-hardness of the carbon protective layer of the floppy disk is within the range of 20–40 GPa, micro-hardness of the carbon protective layer on the surface of the head or the slider is 30 GPa or more, and hardness of the carbon protective layer of the floppy disk is lower than hardness of the carbon protective layer on the surface of the head or the slider.

DESCRIPTION OF THE PREFERRED EMBODIMENT

Figure 1:
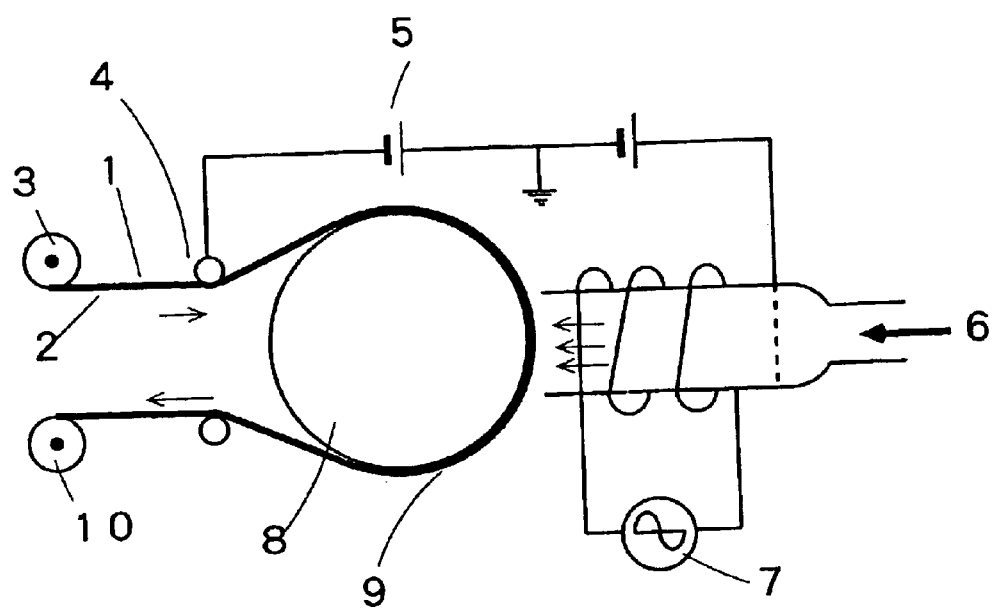
FIG. 1 is a drawing to explain an example of a CVD system using high frequency plasma.

The magnetic disk according to the present invention is characterized in that it has a protective layer. The protective layer comprises carbon, hydrogen and nitrogen. More preferably, it contains rare gas elements. Further, it is preferable that this protective layer has nitrogen content of 0.5–8.0 atom %, hydrogen content of 25–35 atom %, carbon content of 60–70 atom %, and rear gas element content of 0.5–1.2 atom %. With the contents of the elements as described above, hardness and friction coefficient can be compatible with each other at very high level. The contents of these elements can be determined by methods already known in the art such as Rutherford backscattering method.

If nitrogen content is lower than the above value, friction coefficient increases. If it is higher than the above value, hardness is extremely decreased. The more preferable nitrogen content is 2–5 atom %. If the content of rare gas elements is lower than the above value, hardness decreases. If it is higher than this, internal stress increases, and the film may become more easily detachable. The more preferable rare gas content is 0.5–1.0 atom %. If the content of carbon is lower or higher than the above value, hardness decreases. The more preferable carbon content is 64–67 atom %. If the content of hydrogen is lower than the above value, hardness decreases. If it is higher than the above, friction coefficient increases. The more preferable hydrogen content is 28–33 atom %.

The present invention is characterized in that high hardness can coexist with low friction coefficient. In case a thin film is used as the protective layer, hardness is under strong influence of an underlying base material, and it cannot be measured accurately. In this respect, a protective layer is usually prepared in film thickness of about 0.1–1 μm on a uniform and somewhat hard substrate such as single crystal silicon substrate, and hardness is measured using a micro-hardness meter based on AFM so that indentation depth will be less than ⅕ of film thickness. In an example of the micro-hardness meter, a pick-up electrode provided with an indenter is placed between two electrode plates. Using the change in capacitance associated with the movement of the electrode, force and displacement are detected with high sensitivity. In the following, more concrete description will be given on the measurement using a micro-hardness measuring instrument (Hysitron; Triboscope). A diamond indenter is designed in a form of a trilateral pyramid with sharp angle of 90° and radius of curvature at the tip of 35–50 nm. It is applied on a protective layer in perpendicular direction, and the applied load is gradually increased to the maximum load of P=600 µN. After the maximum load has been reached, the load is gradually decreased to 0.

The maximum load P in this case is divided by a projection area A of the indenter contact, and hardness is calculated as P/A. The projection area A of the indenter contact is obtained as follows: In a depth-load curve obtained by indentation test, initial 30% of unloading curve is approximated to a straight line for extrapolation, and a point where it crosses depth axis is regarded as contact depth "h" of the indenter contact. From the shape of the indenter, the projection area can be obtained as a function of the value of "h". Using a standard specimen which shows the hardness of 8–10 GPa when molten quartz is indented, the device is calibrated in advance. The protective layer of the present invention has hardness of 30–40 GPa when it is measured by the above method. This is much higher than the hardness of 20–30 GPa of the protective layer, which comprises carbon, hydrogen and nitrogen and is prepared by reactive sputtering method.

On the other hand, friction coefficient can be measured in the form of magnetic recording medium. For measurement, frictional force on an actual magnetic head may be measured. As an alternative method, measurement may be made in ball-on-disk mode or pin-on-disk mode. In particular, the effects of the present invention can be seen in the friction coefficient when sliding is performed repeatedly on a point. Low frictional force can be maintained for long time even under the sliding condition where, in case of a general type DLC film, frictional force is gradually increased due to the repeated sliding movement and scratches may occur. Even under the condition where a protective layer with low frictional force and high nitrogen content is gradually worn out, the protective layer of the present invention is not worn out almost at all.

The protective layer for the magnetic disk of the present invention can be manufactured in the following manner: A magnetic layer is prepared at least on one surface of a non-magnetic support member by the sputtering method. Then, with negative bias voltage applied on the magnetic layer, a protective layer containing carbon, hydrogen and nitrogen is prepared on the surface of the magnetic layer by plasma CVD method using a mixed gas of hydrocarbon and nitrogen as raw material. Further, a lubricating layer is prepared on the surface. The protective layer prepared by this method has higher hardness than the protective layer prepared by reactive sputtering, and it can extensively improve the running durability of the magnetic disk.

In the manufacturing method of the present invention as described above, by applying negative bias voltage on the magnetic layer, hydrocarbon in the reactive gas is decomposed and hydrogen ions and rare gas ions are generated and etching effect can be increased. As a result, DLC with high hardness can be manufactured. The bias voltage applied on the magnetic layer varies according to each device, and it is not necessarily determined in simple manner. It is usually within the range of −100 V to −500 V. There is an optimal value for the bias voltage applied. If the bias voltage is too high, the content of rare gas in the protective layer is increased. This leads to higher internal stress in the protective layer and is vary likely to cause the detachment of the film. On the contrary, if the bias voltage is too low, etching effect is decreased. As a result, the contents of hydrogen and nitrogen in the film are increased, and hardness is extensively reduced. In case positive bias voltage is applied on a position, which is opposite to the substrate with the plasma interposed between, and when bias gradient is increased, the effect of bias voltage application can be more easily obtained.

As the raw material gas to be used in the manufacture of the protective layer of the present invention, a mixed gas of hydrocarbons containing carbon and hydrogen such as ethylene, acetylene, methane, ethane, benzene, toluene, etc., nitrogen, and rare gas such as argon, helium, etc. is used. The contents of carbon and hydrogen in the hydrocarbon gas exerts strong influence on the property of the protective layer. For example, if the ratio of hydrogen to carbon is very high as in the case of methane, hydrogen content in the film is increased, and sufficient hardness may not be attained. On the contrary, if the ratio of hydrogen to carbon is low as in the case of acetylene, nitrogen content is too high, or organic property of the film is high, and hardness may not be so high. Therefore, it is preferable to use a raw material such as ethylene, which has hydrogen/carbon ratio of about 2/1. It is preferable that the mixing ratio of hydrocarbon/nitrogen in the raw material is about 5/5–9/1. If the content of hydrocarbon is higher than the above range, the content of nitrogen is decreased, and the effect to decrease friction coefficient will be lower. If nitrogen content is higher than the above range, hardness is decreased. Further, the ratio of "(hydrocarbon+nitrogen)/rare gas" is preferably about 1/1–1/3. If rare gas content is lower than the above ratio, etching effect is lower, and hardness is not high. If rare gas content is higher than the above range, the rare gas content in the film is increased, and this makes the film more easily detachable. As the rare gas to be used, helium, neon, argon, krypton, xenon, etc. may be used. More preferably, argon, neon, and helium may be used, or most preferably, argon may be used.

There is no special restriction on the method to generate plasma in the present invention. High frequency plasma, ECR plasma, etc. may be used.

FIG. 1 is a drawing to explain an example of a CVD system utilizing high frequency plasma.

A support member 2 with a metal thin film 1 formed on it is unwound from a roll 3. Via a pass roller 4, bias voltage is supplied to the metal thin film 1 from a bias power source 5.

On the other hand, a raw material gas 6 containing hydrocarbon, nitrogen, rare gas, etc. forms a carbon protective layer 9 containing nitrogen and rare gas on a metal thin film on a film forming roll 8 by the plasma generated by the voltage applied from a high frequency power source 7, and the protective layer is wound up on a take-up roll 10.

When the film is formed, if substrate temperature for forming the protective layer is adjusted to room temperature and not to high temperature, hardness is slightly increased, and the damage of the substrate may be prevented.

The protective layer of the present invention has high adhesive property to adhere to the magnetic layer. If the surface of the magnetic layer is cleaned up by glow processing using rare gas or hydrogen gas prior to the preparation of the protective layer, high adhesive property can be maintained. If a silicon intermediate layer is prepared on the surface of the magnetic layer, adhesive property can be increased further.

The protective layer of the present invention prepared by the above method appears to have such a structure that a part of hydrogen atoms in amorphous and hydrogenated very hard carbon film is replaced by nitrogen atoms. By Raman spectroscopic analysis, it can be confirmed that basic structure of the film is the same as DLC. When Raman spectrum of DLC film is examined, a broad peak is found at Raman shift 1000–1800 cm$^{-1}$. It is known that this peak comprises a main peak called "G peak" at 1540 cm$^{-1}$ and a shoulder called "D peak" at 1390 cm$^{-1}$. Raman spectrum of the protective layer of the present invention also shows the same spectrum as the Raman spectrum of DLC as described above. The ratio |d/1 g, which is known to be reflecting sp$^2$ structure and the ratio of sp2 structure, is 1.10–1.60 in the protective layer of the present invention. Number of G peak protective waves, which is known to be reflecting sp crystallite size, is 1540–1560 cm$^{-1}$. These values are common numeral values. On the other hand, the ratio B/A (where B represents intensity at G peak including background known to be reflecting organic property of the film, and A represents intensity at G peak not including background) is as low as 1.20–1.25. Thus, organic property is low.

In the protective layer of the present invention, nitrogen is mostly bonded to sp3 or sp2 carbon atoms and it is present in stable state in the film. This is confirmed by X-ray photoelectron spectroscope (ESCA XPS) and FT-IR method. CN bonding as seen in the film, which has been prepared by the sputtering method and has nitrogen content of more than 20 atom %, is lower than the detection limit, and it appears that nitrogen is not present in the state of this bonding.

The density of the protective layer of the present invention is as dense as 1.7–2.1 g/cm$^3$. The density can be obtained from the density of number of atoms by Rutherford backscattering method.

It is preferable that the protective layer of the present invention is used in film thickness of 3–20 nm. If film thickness is thinner than this range, the effect as the protective layer cannot be obtained. If it is thicker than this range, electromagnetic transfer characteristics as a magnetic recording medium are decreased due to magnetic spacing, and this is not desirable. The protective layer of the present invention is characterized in that it has durability on a thin film of 10 nm or less compared with the protective layer prepared by general reactive sputtering method.

In the following, description will be given on the preferred embodiment of a floppy disk, i.e. a magnetic disk used on a flexible support member. In the present invention, a rigid support member may also be used as the non-magnetic support member.

When this is used in form of a hard disk, a disk-type substrate made of aluminum, glass, carbon, silicon, polycarbonate, etc. may be used.

When this is used in form of a tape such as video tape, a flexible macromolecular film of 3–20 μm in thickness and made of polyethylene terephthalate, polyethylene naphthalate, polyimide film, polyamide film, etc. may be used.

When this is used in form of a floppy disk, flexible macromolecular film of 20–100 μm in thickness and made of polyimide, polyamide, polyethylene naphthalate, etc. may be used. To maintain high electromagnetic transfer characteristics, it is preferable that surface roughness of the magnetic layer (Ra) is not more than 2 nm, and the maximum surface roughness (Rmax) is not more than 60 nm.

The floppy disk of the present invention is prepared by punching a web-like, sheet-like or disk-like floppy disk material to a doughnut-like disk. The size of the disk may be in any of the following types: 1.8 type, 2.5 type, 3.5 type, 3.7 type or 5 type.

The thickness of the disk used in the present invention is preferably in the range of 20–100 μm, or more preferably, in the range of 30–80 μm. If it is thinner than 30 μm, static curl or deformation increases. If it is thicker than 80 μm, it is not possible to alleviate the shock when the head comes into contact with the disk.

However, the surface of the magnetic layer such as polyimide film or aramide film is not so smooth and flat as the film described above, and it is necessary to prepare an undercoating film with the purpose of smoothening on the surface of the magnetic layer. In this case, as the material for the undercoating layer, it is preferable to use thermosetting type imide or thermosetting type silicon resin, which has higher smoothening effect. The thickness of the undercoating film is preferably 0.1–3 μm. The thermosetting resin can be prepared by coating a silane coupling agent having epoxy group or monomer containing thermosetting imide, and then, by processing it by thermosetting procedure.

The thermosetting imide is a monomer, which has imide structure and a polymerizable terminal group. This monomer is polymerized by heating and is turned to have polyimide structure, and it has high heat-resistant property. This thermoplastic imide is in the state of monomer before it is bonded, and it is soluble in a wide variety of solvents and in most of the commonly used solvents. In this respect, it is easy to dry up the solvent. Further, it has low solution viscosity, and it can be filtered by precise filtration and it contains very few foreign objects. As the thermosetting imide, it is particularly adequate to use bis-allyl-nadiimide expressed by the following chemical formula 1:

Formula 1

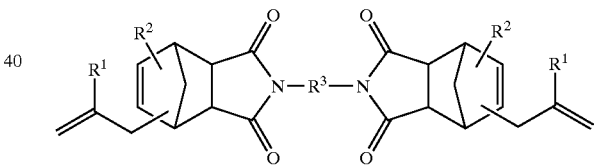

where R$^1$ and R$^2$ each represents a hydrogen atom or a methyl group independently selected, and R$^3$ is a bivalent coupling group such as aliphatic or aromatic hydrocarbon group.

In a compound given by the formula 1, R$^1$ and R$^2$ each represents a hydrogen atom or a methyl group independently selected, and R$^3$ is a bivalent aliphatic or aromatic coupling group. For example, this may be an alkylene group and an alkenyl group of straight-chain or branched structure, cycloalkylene group, cycloalkylene group having alkylene group, aromatic group, aromatic group having alkylene group, polyoxyalkylene group, carbonyl group, ether group, etc.

As these compounds, the compounds synthesized by the synthetic method already known in the art as described in JP-A-59-80662, JP-A-60-178862, JP-A-61-18761, JP-A-63-170358, JP-A-7-53516, etc. may be used. Such compounds are commercially marketed by Maruzen Petrochemical Co., Ltd. as BANI series and ANI series products.

As already known in the art, when micro-size and low-profile projections are provided on the surface of the medium, true contact area between the medium and the sliding member can be decreased, and sliding property can be improved. In this respect, it is particularly preferable to provide micro-size projections on the surface of the magnetic layer. To prepare such micro-size projections on the surface, there are methods such as a method to coat spherical silica particles, a method to form organic projections by coating emulsion, etc. To maintain heat-resistant property, it is preferable to use silica particles. To fix the projections on film surface, a binder may be used. To maintain heat-resistant property, it is preferable to use resin with high heat-resistant property. In particular, it is preferable to use thermosetting imide or thermosetting silicone resin as such material. The height of the micro-size projections is 5–60 nm, or more preferably, 10–30 nm. Its density is preferably 0.1–100 projections/$\mu m^2$, or more preferably, 1–30 projections/$\mu m^2$. If the height of the micro-size projection is too high, electromagnetic transfer characteristics are decreased due to spacing between the recording/reproducing head and the medium. If the micro-size projections are too low, the effect to improve the sliding property is decreased. If the density of the micro-size projections is too low, the effect to improve sliding property is decreased. If it is too high, higher projections are increased due to the increase of agglomerated particles, and this leads to lower electromagnetic transfer characteristics. The coating thickness of the binder is preferably not more than 20 nm. If the binder is too thick, blocking (i.e. the bonding to the rear surface of the film) may occur after drying.

As ferromagnetic metal thin film to be used as the magnetic layer in the magnetic disk of the present invention, the film prepared by the sputtering method already known in the art may be used.

As the composition of the film, metal or alloy already known in the art and mostly based on cobalt may be used. More concretely, Co—Cr, Co—Ni—Cr, Co—Cr—Ta, Co—Cr—Pt, Co—Cr—Ta—Pt, Co—Cr—Pt—Si, Co—Cr—Pt—B, etc. may be used. In particular, it is preferable to use Co—Cr—Pt or Co—Cr—Pt—Ta to improve electromagnetic transfer characteristics. It is preferable that the thickness of the magnetic layer is 10–30 nm. In this case, it is preferable to provide an underlying film to improve static magnetic property of the magnetic layer. As the composition for the underlying film, metal or alloy already known in the art may be used. More concretely, Cr, V, Ti, Ta, W, Si, etc. or alloy of these metals may be used, or more preferably, Cr, Cr—Ti, and Cr—V may be used. The thickness of the underlying film is preferably 5–50 nm, or more preferably, 10–30 nm. To control crystal orientation of the underlying film, it is preferable to use a shield layer under the underlying film. More concretely, it is preferable to use Ta, Mo, W, V, Zr, Cr, Rh, Hf, Nb, Mn, Ni, Al Ru, Ti or alloy of these metals. More preferably, Ta, Cr, Ti or alloy of these metals may be used. The thickness is preferably 15–60 nm. When the magnetic layer is prepared by the sputtering method, it is preferable to form the film by heating the substrate. In this case, the temperature is about 200° C.

In the magnetic disk of the present invention, it is necessary to provide a lubricating layer or a rust-preventive agent on the protective layer to improve running durability and corrosion-resistant property.

As the lubricant, hydrocarbon type lubricant, fluorine type lubricant, extreme-pressure additive, etc. already known in the art may be used. As the hydrocarbon type lubricant, carboxylic acids such as stearic acid, oleic acid, etc., esters such as butyl stearate, sulfonic acids such as octadecyl sulfonic acid, phosphoric acid esters such as monooctadecyl phosphate, alcohols such as stearyl alcohol, oleyl alcohol, etc., carboxylic acid amide such as stearic acid amide, etc., amines such as stearyl amine may be used.

As the fluorine type lubricant, a lubricant prepared by substituting a part or all of the alkyl groups in the hydrocarbon type lubricant by fluoroalkyl group or perfluoro-polyether group may be used. As the perfluoro-polyether group, perfluoro-methylene oxide polymer, perfluoro-ethylene oxide polymer, perfluoro-n-propylene oxide polymer $(CF_2CF_2CF_2O)_n$, perfluoroisopropylene oxide polymer $(CF(CF_3)CF_2O)_n$, or copolymer of these compounds may be used. Also, a compound prepared by introducing fluorine or fluorinated alkyl group into phosphagen ring is also thermally and chemically stable and may be used.

As the extreme-pressure additive, phosphoric acid esters such as trilauryl phosphate, phosphorous acid esters such as trilauryl phosphite, thiophosphorous acid esters such as trilauryl trithiophosphite, sulfur type extreme-pressure agent such as dibenzyl disulfide may be used.

The lubricants as described above may be used alone or in combination. To apply these lubricants on the protective layer, the lubricant is dissolved in an organic solvent, and it is coated by wire bar method, gravure method, spin coat method, dip coat method, etc., or it may be attached by vacuum evaporation method.

The coating quantity of the lubricant is preferably 1–30 mg/$m^2$, or more preferably, 2–20 mg/$m^2$.

As the rust-preventive agent to be used in the present invention, nitrogen-containing heterocyclic compounds such as benzotriazole, benzimidazole, purine, pyrimidine, etc., derivatives prepared by introducing alkyl side-chain to or the base nucleus, nitrogen- or sulfur-containing heterocyclic compounds and derivatives such as benzothiazole, 2-mercaptobenzothiazole, tetrazaindene cyclic compound, thiouracil compound may be used. As tetrazaindene cyclic compounds to be used for this purpose, the following compound may be used.

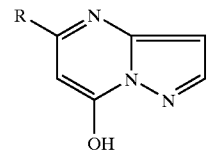

where R represents a hydrocarbon group selected from alkyl group, alkoxy group, or alkylamide group.

More preferably, it contains 3–20 carbon atoms. In case of alkoxy group, R in ROCOCH$_2$— is $C_3H_7$—, $C_6H_{13}$—, or phenyl. In case of alkyl group, it is $C_6H_{13}$—, $C_9H_{19}$—, or $C_{17}H_{35}$—. In case of alkylamide, R in RNHCOCH$_2$— is phenyl or $C_3H_7$—.

As the thiouracil cyclic compound, the following compound may be used:

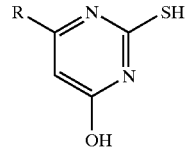

where R is the same compound as in tetrazaindene cyclic compound as described above.

When the medium of the present invention is used as a floppy disk, the disk is incorporated in a cartridge already known in the art. This is very important not only to prevent contamination from outside of the cartridge but also to maintain rotating stability of the floppy disk.

In the magnetic recording mode using the floppy disk of the present invention, a floppy disk with ferromagnetic metal thin film and carbon protective layer coated at least on one surface of the flexible support member is used as a magnetic recording medium, and a recording signal is recorded or reproduced by a floppy disk device with carbon protective layer provided on the surface of the head or the slider. In the magnetic recording mode using this floppy disk, high reliability can be attained in practical use by the combination of the disk and the head. If one of these two is missing, the effects of the present invention cannot be provided.

In the magnetic recording mode using the floppy disk of the present invention, when the floppy disk and the head or the slider are brought into contact with each other and are put into sliding operation, friction occurs under the condition that the lubricant is present between the carbon protective layer of the disk and the carbon protective layer of the head or the slider. In case friction occurs between a part of carbon atoms, it is known that friction coefficient is low, and amount of friction is not much. In the magnetic recording mode using the floppy disk of the present invention, such satisfactory sliding condition is achieved. The lubricant of the floppy disk comes into contact with chemically inactive carbon on the surfaces of both the disk and the head. As a result, it is resistant to chemical decomposition, and lubricating effects can be maintained for long time.

In the present invention, if the carbon protective layer of the floppy disk is missing or if other protective layer such as silica is used, friction occurs on the carbon protective layer on the surface of disk or head, and the disk may be damaged or head output may be decreased within short time. If the carbon protective layer is missing on the head or if a protective layer such as silica is used, wearing of the carbon protective layer of the floppy disk and decomposition of the lubricant are enhanced, and this often leads to the shortening of the service life of the disk.

The effects of the present invention are increased when hardness of the carbon protective layer of the floppy disk is lower than hardness of the carbon-protective layer on the slider surface. In particular, the effects are remarkably increased when micro-hardness of the carbon protective layer of the floppy disk is within the range of 20–40 GPa and micro-hardness of the carbon protective layer on the head or slider surface is 30 GPa or more. When the floppy disk and the bead have the same carbon protective layer, friction occurs on the carbon protective layer although very slightly. During long-term use, the protective layer of the head may be worn out and may disappear earlier than that of the disk because the sliding lasts relatively longer on the same portion of the head than on the disk. For this reason, hardness of the protective layer of the head is designed to be higher than hardness of the protective layer of the floppy disk, and this is helpful in extending service life of the protective layer of the head.

Further, if the micro-hardness of the carbon protective layer of the floppy disk is set within the range of 20–40 GPa and the micro-hardness of the carbon protective layer on the surface of the head or the slider is set to 30 GPa or more, each of the protective layers can attain satisfactory wear resistance, and this extensively promotes the reliability of the floppy disk in practical use. In case the micro-hardness of each of the protective layers is lower than 20 GPa, wear resistance is not high enough. As a result, the protective layer may be worn out, and service life of the floppy disk may be shortened. In case the micro-hardness of the protective layer of the floppy disk is set to higher than 40 GPa, service life of the protective layer of the head may be shortened or the magnetic layer may be detached or peeled off due to the increase of friction coefficient.

As the carbon protective layer to be used in the head or the slider in the present invention, the same carbon protective layer as the one formed on the magnetic recording medium may be used. More concretely, a commonly used amorphous carbon film or graphite film, diamond film, etc. may be used. Above all, an amorphous carbon film called diamond-like carbon film (DLC film) is useful to prepare a protective layer with high hardness. Depending on the manufacturing condition, the properties such as hardness or friction coefficient can be easily controlled, and this is suitable as the carbon protective layer to be used in the present invention.

It is preferable that diamond-like carbon film or diamond film is used as the protective layer for the head or the slider in the present invention, and more preferably, the diamond-like carbon film is used.

It is preferable that hardness of the protective layer of the head or the slider is higher than the hardness of the protective layer of the floppy disk. By adjusting the hardness in this way, service life of the protective layer of the head can be extended. Further, it is preferable that hardness of the protective layer of the head or the slider is 30 GPa or more. If the protective layer is too thick, electromagnetic transfer characteristics may be deteriorated or adhesive property may be decreased. If it is too thin, wear resistance is not high enough. Thus, the film thickness is preferably 1–30 nm, or more preferably, 2–10 nm.

More preferably, the protective layer for the head or the slider comprises carbon, hydrogen, and rare gas elements with carbon content of 50–80 atom %, hydrogen content of 20–50 atom %, and rare gas content of 0.5–1.2 atom %. The contents of these elements can be determined by the methods already known in the art such as Rutherford backscattering method.

If hydrogen content is lower than 20 atom %, hardness decreases. If it is higher than 50 atom %, friction coefficient increases. The more preferable hydrogen content is 35–45 atom %. If the content of rare gas elements is lower than 0.5 atom %, hardness decreases. If it is higher than 1.2 atom %, internal stress increases, and this makes the film easily detachable. The more preferable rare gas content is 0.5–1.0 atom %.

As the head to be used in the magnetic recording mode using the floppy disk of the present invention, an inductive head used in hard disk drive or MR head using magnetic resistance element may be used. To increase the recording density, it is preferable to use MR head for the reproduction head. In addition to the commonly used MR head, G-MR head, or dual-stripe type MR head, etc. may be used. Above all, the dual-stripe type MR head is suitable for the floppy disk system of the present invention because it can reduce generation of thermal asperity due to the structure of the head.

As the slider with the head mounted on it, the slider having the same structure as the one used in hard disk drive may be used. For example, taper-flat type positive pressure slider or the slider with slot on rail, tripad slider, or negative pressure slider may be used. Above all, it is preferable to use the taper-flat type positive pressure slider or the one with slot on rail combined with the floppy disk because this prevents influence of surface deviation of the disk. For example, the slider is made from a ceramic material such as $Al_2O_3$—TiC, alumina, zirconia, $CaTiO_3$, etc. When the carbon protective layer of the present invention is placed on the slider, it is preferable to provide an intermediate layer of silicon or its oxide or nitride in order to improve the adhesive property as described above. The thickness of the intermediate layer is preferably 1–5 nm. The slider in such size as commonly used in hard disk may be used. Above all, the slide of such size as the so-called nano-slider (50% slider), or pico-slider (30% slider) is suitable because of the property to follow up disk vibration or because of its availability.

The head and the slider can be prepared by the same method as the method to manufacture the head for hard disk drive. For example, on a substrate of slider material such as $Al_2O_3$—TiC, a number of head elements are formed at a time by the sputtering method. Then, the slider is cut off from the substrate and is washed, and an adhesive layer and a carbon protective layer are formed on the sliding surface of the slider. Further, the surface is shaped by ion milling method in order to control floating.

To follow up disk vibration while applying adequate load on the slider, a suspension mechanism made of spring-like member as used in hard disk drive may be used. Above all, the mechanism having adequate load of 9.8–58.8 mN (1–6 gf) is suitable. If the load is lower than 9.8 mN, the head often jumps off from the disk, and this leads to dropout of the reproduced signal. On the contrary, if the load is higher than 58.8 mN, the disk may be more easily worn out, and service life of the disk may be shortened.

As the head driving mechanism, the so-called inline type and transverse type can be used. In case disk diameter is relatively large, e.g. 3.5 type, it is preferable to use the transverse type. This is because head window of the shell can be reduced in size by the use of the transverse type head driving mechanism, and it is possible to reduce surface deviation of the disk. In the present invention, two heads are combined in such manner that these are arranged at symmetrical positions with respect to front and rear surfaces of the floppy disk. As the shell to form floppy disk cartridge in the present invention, the material such as ABS resin may be used. In order to protect the disk inside, it is essential to provide sufficient strength not to be deformed by possible external force. To prevent vibration during rotation, it is preferable to design with such strength and structure as to match disk size and number of rotations.

It is preferable that width of internal space formed by upper shell and lower shell is within the range of 0.5–2.0 mm. If it is narrower than this, the floppy disk may be brought into close contact with shell or liner during rotation, and this increases the wearing of the disk. If it is wider than the above range, the effect to control the rotation of the disk is reduced.

On the surface inside the shell in contact with the floppy disk, it is preferable to provide a liner with the purpose of cleaning the floppy disk and of preventing contact or adhesion of the floppy disk with the shell. As the material of the liner, nonwoven fabric made of cellulose type fibers such as rayon fiber, polynosic fiber, cupra fiber, acetate fiber, etc. may be used, and these are blended with polyester fiber and acrylic fiber. In the liner, rust-preventive agent, lubricant, antistatic agent, fungicide, etc. may be contained.

The number of revolutions of the disk in the present invention is 2000 rpm or more, or more preferably, 2500–7200 rpm. If the number of revolutions is lower than this range, floating power applied on the head is lower. As a result, contact frequency between the disk and the head is extremely increased, and service life may be shortened. Also, data transfer rate necessary for high density recording is decreased and this is not desirable. If the number of revolutions is too high, the disk may be vibrated in such manner that its cycle is not exactly one cycle, and the head cannot follow up the disk. This aggravates error rate or the disk may be more easily worn out.

Embodiments

In the following, description will be given on examples of the present invention.

EXAMPLES 1-1 TO 1-20 AND COMPARATIVE EXAMPLES 1-1 TO 1-3

Protective layers were prepared for each of the following: a hard disk for evaluation of sliding property, a floppy disk for evaluation of sliding property, and a specimen for hardness measurement. Composition of each of these protective layers was determined. Hardness test was performed on the specimen for hardness measurement, and ball-on-disk test (BOD test) and contact-stop-start test (CSS test) were performed on the hard disk. On the floppy disk, friction test and durability test were carried out.

Preparation of Hard Disk for Evaluation of Sliding Property

An aluminum substrate for hard disk with its surface mirror-polished and processed by Ni—P plating was heated at 200° C. Then, an underlayer of Cr—Ti was formed in film thickness of 30 nm by DC magnetron sputtering method. Then, a Co—Cr—Pt magnetic layer was formed in film thickness of 25 nm. Further, the surface was cleaned up by argon glow method, and protective layers each of 20 nm in thickness were formed on it under the film forming condition shown in Table 1. The films of Examples 1 to 18 and Comparative examples 1 to 2 were prepared by high frequency plasma CVD method, and the films of Examples 19–20 and Comparative example 3 were prepared by reactive sputtering method with graphite as target. Perfluoropolyether lubricant (Ausimont; Fomblin Z-Dol) and fluorine-introduced phosphagen cyclic compound (Dow Chemical; X-1P) were dissolved in a fluorine type solvent (Sumitomo 3M; HFE-7200). This solution was filtered through a filter with bore size of 0.1 µm. This was coated on the above protective layer by dip coating method, and a lubricating layer of 1 nm in thickness was prepared.

Floppy Disk for Evaluation of Sliding Property

On both surfaces of polyimide film with maximum surface projection roughness of 200 nm and with thickness of 75 µm, thermosetting type imide resin (Maruzen Petrochemical Co, Ltd.; BANI-NB) was dissolved in a mixed solvent of ethanol and cyclohexanone. This solution was filtered through a membrane filter with bore size of 0.1 µm, and this was coated on both surfaces of polyimide film. This was heated at 250° C. for 12 hours, and an undercoating film was prepared. Further, organo-silica sol with particle size of 18 nm dispersed in cyclohexanone was coated on the undercoating film by dip coating method. This was dried at 250° C. for one hour, and micro-size projections were formed on the surface of the undercoating film. The density of the micro-size projections was 10 projections/$\mu m^2$. Next, this support member was squeezed by a holder and was placed in a sputtering device for forming a magnetic layer. After the support member was heated at 200° C., a Cr—Ti underlying film was formed in thickness of 30 nm by DC magnetron sputtering method. Further, Co—Cr—Pt magnetic layer of 25 nm in thickness was formed. The underlying film and the magnetic layer were formed on both surfaces of the support member. Further, the surface of the magnetic layer was cleaned up by argon glow discharge. Under the film forming conditions shown in Table 1, protective layers each having 20 nm in thickness were prepared on the surface of the magnetic layer by high frequency plasma CVD method for Examples 1 to 18 and Comparative examples 1 to 2, and by reactive sputtering method using graphite as target for Examples 19 to 20 and Comparative example 3. Next, the specimens were taken out from the holder. Perfluoro-polyether type lubricant (Ausimont; Fomblin Z-Dol) and fluorine-introduced phosphagen cyclic compound (Dow Chemical; X-1P) were dissolved in a fluorine type solvent (Sumitomo 3M; HFE-7200). This solution was filtered through a filter with bore size of 0.1 μm, and this was coated on the above protective layer by dip coating method, and a lubricant film of 1 nm in thickness was prepared. This specimen was punched into a shape of 3.7-type magnetic disk and was incorporated into a cartridge, and a floppy disk was prepared.

Specimen for Hardness Measurement

After a mirror-polished single crystal silicon substrate was cleaned up by argon glow, protective layers each of 0.15 μm in thickness were formed on the substrate by high frequency plasma CVD method for Examples 1-1 to 1-18 and Comparative examples 1-1 to 1-2, and by reactive sputtering method using graphite as target for Examples 1-19 to 1-20 and Comparative example 1-3 under the film forming condition shown in Table 1.

The specimens thus prepared were evaluated by the methods given below. The results are shown in Table 2.

Methods of Evaluation (1) Evaluation of Friction Coefficient and Durability by Ball-on-disk Test Ball-on-disk test was performed using an $Al_2O_3$—TiC ball of ¼ inch in diameter as slider. Load was set to 10 gf, position of measurement radius was set to 30 mm, and number of revolutions of disk was set to 60 rpm. Frictional force applied on the slider during the test was measured by a strain gauge, and friction coefficient was obtained. When friction coefficient exceeded 0.5, the test was terminated, and the test was performed up to 300 minutes at maximum. Environmental conditions for testing were: 23° C. and 50% relative humidity. The result was recorded as BOD1 and this was expressed in minute. For the specimen, which showed durability for more than 300 minutes with the load of 10 gf, the test was performed in the same manner for the load of 20 gf, and this was recorded as BOD2.

(2) Evaluation of Durability by CSS Test

CSS test required for hard disk was performed using a taper-flat type $Al_2O_3$—Tic slider with magnetic head mounted on it. CSS test is a contact stop and start test, i.e. rotation of disk is stopped after it is brought into close contact, and rotation is started under close contact condition. One CSS cycle comprises: acceleration from 0 to 3000 rpm for 3 seconds—rotation maintained at 3000 rpm for 10 seconds—deceleration from 3000 to 0 rpm for 3 seconds—stop for 3 seconds. The test was performed up to 10,000 cycles. The load was set to 5 gf, and position of measurement radius was set to 35 mm. During the test, frictional force applied on the slider was measured by a strain gauge. Durability was evaluated by the number of cycles when frictional force during deceleration exceeded 5 gf.

In the table, the number of cycles in the measurement results was given in multiplication factor of 1000×.

(3) Measurement of Frictional Force of Floppy Disk

On the floppy disk, frictional force was measured using a floppy disk drive (Fuji Photo Film Co., Ltd.; Zip Drive). The floppy disk was mounted on a spindle and it was rotated at 3000 rpm. Under the rotating condition, a head for Zip 100 was pressed on both surfaces of the disk to apply a load of 5 gf, and frictional force applied on the head was measured by a strain gauge. Frictional force was determined as average value of frictional forces applied on upper head and lower head after one minute from the initiation of running operation. Environmental conditions for measurement were 23° C. and 50% relative humidity.

(4) Fixed Track Durability Test by Floppy Disk Drive

On the floppy disk, running durability test was performed using a floppy disk drive (Fuji Photo Film Co., Ltd.; Zip Drive). The head was fixed at a position of 20 mm in radius.

On both surfaces of the disk, recording and reproduction of a signal of 8 MHz were repeated at 1-minute cycle, and the time until reproduction output was attenuated to −6 dB of the initial output was determined. The test was performed up to 300 hours at maximum. Environmental conditions for the measurement were 23° C. and 50% relative humidity.

(5) Hardness

On the specimen for hardness measurement, hardness was determined using a micro-hardness meter (Hysitron; Triboscope). Diamond indenter used for the measurement was in form of a trilateral pyramid with sharp angle of 90° and radius of curvature at the tip of 35–50 nm. This was applied to the protective layer in perpendicular direction, and the load was applied gradually increasing to the maximum load of P=600 μN. After the maximum load was reached, the load was gradually decreased to 0.

The maximum load P at this moment was divided by projection area A of indenter contact, and the value of P/A was calculated as hardness. In a depth-load curve obtained by indentation test, the initial 30% of unloading curve was approximated to a straight line and was extrapolated. An intersection point with depth axis was defined as contact depth "h" of the indenter contact. The projection area A of the indenter contact is obtained as a function of "h" depending on the shape of the indenter. Using a standard specimen, which has hardness of 8–10 GPa when molten quartz is indented, the device was calibrated in advance, and measurement was performed.

(6) Chemical Composition

On the specimen for hardness measurement, the compositions of C, H, N and rare gas were determined by Rutherford backscattering method.

TABLE 1

| Specimen | Hydrocarbon gas flowrate (ccm) | Nitrogen flowrate (ccm) | Rare gas Flowrate (ccm) | Bias voltage on substrate (V) | Applied electric power (W) |
|---|---|---|---|---|---|
| Example 1-1 | Ethylene 75 | 75 | Argon 300 | −500 | 500 |
| Example 1-2 | Ethylene 90 | 60 | Argon 300 | −500 | 500 |
| Example 1-3 | Ethylene 105 | 45 | Argon 300 | −500 | 500 |
| Example 1-4 | Ethylene 120 | 30 | Argon 300 | −500 | 500 |
| Comparative example 1-1 | Ethylene 135 | 15 | Argon 300 | −500 | 500 |
| Comparative example 1-2 | Ethylene 150 | 0 | Argon 300 | −500 | 500 |
| Comparative Example 1-5 | Ethylene 60 | 90 | Argon 300 | −500 | 500 |
| Example 1-6 | Ethylene 90 | 60 | Argon 300 | −600 | 500 |
| Comparative Example 1-7 | Ethylene 90 | 60 | Argon 300 | −700 | 500 |
| Comparative Example 1-8 | Ethylene 90 | 60 | Argon 300 | −300 | 500 |
| Example 1-9 | Ethylene 90 | 60 | Argon 500 | −500 | 500 |
| Example 1-10 | Ethylene 90 | 60 | Helium 300 | −500 | 500 |
| Comparative Example 1-11 | Ethylene 90 | 300 | — 0 | −500 | 500 |
| Example 1-12 | Methane 150 | 150 | Argon 300 | −500 | 500 |
| Example 1-13 | Methane 150 | 60 | Argon 300 | −500 | 500 |
| Example 1-14 | Acetylene 60 | 90 | Argon 300 | −500 | 500 |
| Example 1-15 | Acetylene 90 | 60 | Argon 300 | −500 | 500 |

TABLE 1-continued

| Specimen | Hydrocarbon gas flowrate (ccm) | Nitrogen flowrate (ccm) | Rare gas Flowrate (ccm) | Bias voltage on substrate (V) | Applied electric power (W) |
|---|---|---|---|---|---|
| Example 1-16 | Ethylene 90 | 60 | Argon 300 | −500 | 700 |
| Example 1-17 | Ethylene 90 | 60 | Argon 300 | −500 | 300 |
| Comparative Example 1-18 | Hydrogen 10 | 5 | Argon 10 | 0 | 700 |
| Comparative Example 1-19 | Hydrogen 10 | 3 | Argon 10 | 0 | 700 |
| Comparative Example 1-20 | Hydrogen 10 | 5 | Argon 10 | −200 | 700 |
| Comparative example 1-3 | Hydrogen 10 | 0 | Argon 10 | 0 | 700 |

TABLE 2

| Specimen | Components and contents (atom %) | | | | Hardness GPa | BOD1 (min) | BCD2 (min) | CSS (×1000) | FD friction (gf) | FD Durability (hour) |
|---|---|---|---|---|---|---|---|---|---|---|
| | Carbon | Hydrogen | Nitrogen | Rare gas | | | | | | |
| Example 1-1 | 62.0 | 29.5 | 7.4 | 1.1 | 32.7 | >300 | >300 | >10 | 0.4 | >300 |
| Example 1-2 | 66.6 | 29.2 | 3.3 | 0.9 | 36.9 | >300 | 263 | >10 | 0.4 | >300 |
| Example 1-3 | 64.9 | 31.7 | 2.6 | 0.8 | 37.0 | >300 | 243 | >10 | 0.6 | >300 |
| Example 1-4 | 65.9 | 32.7 | 0.7 | 0.7 | 36.5 | >300 | 5 | >10 | 0.8 | >300 |
| Comparative example 1-1 | 66.4 | 33.0 | 0 | 0.5 | 38.7 | >300 | 2 | 7.8 | 1.2 | 190 |
| Comparative example 1-2 | 60.6 | 39.0 | 0 | 0.4 | 40.8 | 28 | — | 1.7 | 1.5 | 259 |
| Comparative Example 1-5 | 60.9 | 28.0 | 9.6 | 1.5 | 28.1 | >300 | 261 | 0.1 | 0.5 | 16 |
| Example 1-6 | 67.4 | 28.4 | 3.0 | 1.2 | 37.1 | >300 | >300 | >10 | 0.5 | >300 |
| Comparative Example 1-7 | 68.2 | 27.0 | 3.3 | 1.5 | 39.2 | 12 | — | 0.9 | 0.4 | 98 |
| Comparative Example 1-8 | 59.2 | 35.2 | 5.2 | 0.4 | 27.6 | >300 | 2 | 0.5 | 0.5 | >300 |
| Example 1-9 | 66.5 | 28.8 | 3.5 | 1.2 | 37.1 | >300 | 221 | >10 | 0.6 | >300 |
| Example 1-10 | 63.8 | 30.3 | 4.7 | 1.2 | 30.9 | >300 | >300 | >10 | 0.4 | >300 |
| Comparative Example 1-11 | 57.2 | 37.5 | 5.3 | 0 | 29.4 | 74 | — | 0.4 | 0.9 | 3 |
| Example 1-12 | 60.2 | 32.5 | 6.5 | 0.8 | 28.2 | >300 | 2 | 7.5 | 0.6 | >300 |
| Example 1-13 | 60.6 | 33.5 | 5.2 | 0.7 | 29.1 | >300 | 8 | 9.8 | 0.6 | >300 |
| Example 1-14 | 66.9 | 25.1 | 7.1 | 0.9 | 34.2 | >300 | 32 | 5.4 | 0.5 | 261 |
| Example 1-15 | 68.7 | 25.7 | 4.8 | 0.8 | 35.3 | >300 | 55 | >10 | 0.6 | >300 |
| Example 1-16 | 66.1 | 29.6 | 3.4 | 0.9 | 35.4 | >300 | 191 | >10 | 0.5 | >300 |
| Example 1-17 | 65.2 | 31.9 | 2.4 | 0.5 | 32.4 | >300 | 9 | 7.9 | 0.5 | 290 |
| Comparative Example 1-18 | 57.7 | 30.2 | 12.1 | 0 | 22.2 | 241 | — | 1.5 | 0.6 | 21 |
| Comparative Example 1-19 | 63.7 | 28.8 | 7.5 | 0.4 | 23.6 | 164 | — | 1.2 | 0.8 | 87 |
| Comparative Example 1-20 | 59.1 | 26.4 | 13.8 | 0.7 | 26.1 | 56 | — | 2.6 | 0.8 | 7 |
| Comparative example 1-3 | 78.7 | 20.9 | 0 | 0.4 | 19.8 | 10 | — | 1.9 | 1.6 | 20 | other hand, when flowrate of nitrogen gas is too high, hardness is decreased, and sliding property is deteriorated. The reason for this may be because the protective layer is more easily worn out when hardness decreases.

When bias voltage on substrate is increased, the content of rare gas in the protective layer increases. On the contrary, when bias voltage on substrate is decreased, the content of rare gas decreases. In both cases, sliding property is decreased. In case the content of rare gas is high, this may be caused by the increase of internal stress in the protective layer. If the content of rare gas is low, this may be caused by the decrease of hardness.

When rare gas is changed from argon to helium, sliding property does not show substantial change, but hardness decreases. If rare gas is not added, the contents of hydrogen and nitrogen in the protective layer increase, and both hardness and sliding property are decreased. This may be because organic property of the film is increased.

When methane is used as hydrocarbon gas, the content of hydrogen in the protective layer increases, and hardness and sliding property tend to decrease. On the contrary, when acetylene is used, hydrogen content tends to decrease.

When high frequency electric power is changed, the content of rare gas changes a little, and both hardness and sliding property are changed a little.

The protective layer prepared by reactive sputtering method has low hardness, and its durability is also lower compared with the film of the same composition formed by CVD.

As it is evident from the results shown in Examples and Comparative examples given above:
when flowrates of ethylene and nitrogen are changed, the contents of carbon, hydrogen, nitrogen and rare gas are changed. When nitrogen flowrate is decreased, the contents of nitrogen and rare gas in the protective layer are decreased. In association with this, hardness of the protective layer is increased, while sliding property is decreased. This is because friction coefficient increases when sliding operation is repeatedly performed. On the In the protective layer prepared according to the present invention, high hardness and low friction coefficient can coexist. As a result, the product of the present invention shows high running durability in any type of magnetic disk, i.e. in both hard disk and floppy disk.

EXAMPLES 2-1 TO 2-15 AND COMPARATIVE EXAMPLES 2-1 TO 2-3

On both surfaces of a polyimide film having maximum projection roughness of 200 nm and thickness of 50 μm, thermosetting type imide resin (Maruzen Petrochemical Co., Ltd.; BANI-NB) was coated by dip coating method. Then, it was fired at 250° C. for 12 hours, and an undercoating film of 1.7 μm in thickness was prepared.

On the undercoating film, organo-silica sol of 18 nm in particle size was coated by dip coating method. This was dried at 250°0 C. for one hour, and micro-size projections were formed on the surface of the undercoating film. The density of the micro-size projections thus formed was 10 projections/μm$^2$.

Next, this support member was held in a holder and was placed in a sputtering device. While the support member was heated at 200° C., Cr—Ti underlying film was formed in thickness of 30 nm by DC magnetron sputtering method, and a Co—Cr—Pt magnetic layer was formed in thickness of 25 nm.

The underlying film and the magnetic layer were formed on both surfaces of the support member. Further, the surface of the magnetic layer was cleaned up by argon glow method, and a protective layer of 20 nm in thickness was formed on it by RF plasma CVD method under the film forming conditions given in Table 3.

Next, this specimen was taken out from the holder. Perfluoro-polyether lubricant (Ausimont; Fomblin Z-Dol) was dissolved in a fluorine type solvent (Sumitomo 3M; HFE-7200), and this solution was coated on the protective layer by dip coating method, and a lubricant film of 1 nm in thickness was prepared. This specimen was punched to a shape of 3.7-type magnetic disk and was incorporated in a shell, and a floppy disk was prepared.

Preparation of Magnetic Head

MR head using MR element as reproduction element of magnetic recording signal was mounted on a taper-flat 2-rail type Al$_2$O$_3$—TiC slider (nano-slider). The sliding surface of this slider was cleaned up by argon glow, and silicon film was prepared as an adhesive layer in thickness of 5 nm by DC magnetron sputtering method. A carbon protective layer was formed on it in thickness of 10 nm by RF plasma CVD method under the film forming conditions as shown in Table 3.

This slider was mounted on a suspension unit, and a magnetic head having transverse type head driving mechanism was prepared.

Specimen for Hardness Measurement

In addition to the floppy disk and the magnetic head, a specimen for hardness measurement was prepared. A mirror-polished single crystal silicon substrate was cleaned up by argon glow, and this was prepared in film thickness of 0.1 μm under the same conditions as the protective layer for the floppy disk and the slider.

Evaluation of Running Durability

The floppy disk and the magnetic head with carbon protective layers formed by the film forming conditions of Table 3 were used in combination as shown in Table 4. On a track at a position with a radius of 32 mm from the center of the floppy disk, running durability test was performed. In the test, a signal of 12 MHz was repeatedly recorded and reproduced on both surfaces of the disk at 1-minute cycle, and the time until the reproduction output was attenuated to −6 dB of the initial output was determined. The test was performed up to 300 hours at maximum. The load was set to 34.3 mN, and environmental conditions for measurement were 23° C. and 10% relative humidity. The results are summarized in Table 4.

Hardness Measurement on the Protective Layer

On the specimen for hardness measurement, indentation test was performed using a micro-hardness meter, and hardness was measured.

Using a micro-hardness measuring instrument (Hysitron; Triboscope), the specimen for measurement was cut off in a piece of 1 cm on one side under the following conditions:

Indenter: Diamond indenter
  Sharp angle 90°
  Radius of curvature at the tip 35–50 nm
  (Type: T1-037)
Maximum load: 15 μN
Time of measurement: 5 seconds The specimen was then attached on a metal plate using double-sided adhesive tape. The metal plate with the specimen on it was mounted on the measuring instrument, and the maximum load was applied. Then, the load was gradually decreased to 0. The amount of indentation was measured using an atomic force microscope (Digital Instruments; NanoScope II). The maximum load P was divided by projection area A of indenter contact, and the value P/A was calculated as hardness. The results of measurement are shown in Table 3.

Chemical Composition of Protective Layer

On the specimen for hardness measurement, the compositions of C, H, N and rare gas were determined by Rutherford backscattering method using X-ray photoelectron spectroscopy (ESCA XPS). The results are shown in Table 3.

TABLE 3

| | Gas flowrate (ccm) | | | Substrate bias voltage | Applied electric power | Content (atom %) | | | | Hardness |
|---|---|---|---|---|---|---|---|---|---|---|
| Specimen | C$_2$H$_4$ | Nitrogen | Argon | | | Carbon | Hydrogen | Nitrogen | Rare gas | (GPa) |
| A | 60 | 90 | 300 | −500V | 500W | 60.9 | 28.0 | 9.6 | 1.5 | 28.1 |
| B | 75 | 75 | 300 | −500V | 500W | 62.0 | 29.5 | 7.4 | 1.1 | 32.7 |

TABLE 3-continued

| | Gas flowrate (ccm) | | | Substrate bias voltage | Applied electric power | Content (atom %) | | | | Hardness (GPa) |
|---|---|---|---|---|---|---|---|---|---|---|
| Specimen | $C_2H_4$ | Nitrogen | Argon | | | Carbon | Hydrogen | Nitrogen | Rare gas | |
| C | 90 | 60 | 300 | −500V | 500W | 66.6 | 29.2 | 3.3 | 0.9 | 36.9 |
| D | 90 | 60 | 300 | −300V | 500W | 59.2 | 35.2 | 5.2 | 0.4 | 27.6 |
| E | 105 | 45 | 300 | −500V | 500W | 64.9 | 31.7 | 2.6 | 0.9 | 37.0 |
| F | 120 | 30 | 300 | −500V | 500W | 65.9 | 32.7 | 0.7 | 0.7 | 36.5 |
| G | 135 | 15 | 300 | −500V | 500W | 66.4 | 33.0 | 0 | 0.5 | 38.7 |
| H | 150 | 1 | 300 | −500V | 500W | 60.6 | 39.0 | 0 | 0.4 | 40.8 |
| I | 150 | 0 | 300 | −300V | 500W | 57.4 | 42.3 | 0 | 0.3 | 21.5 |
| J | 150 | 0 | 300 | −200V | 500W | 40.3 | 59.7 | 0 | 0.0 | 8.9 |
| K | No carbon protective layer | | | | | | | | | |

TABLE 4

| Specimen | Type of carbon protection layer on floppy disk | Type of carbon protective layer on magnetic head | Running durability time (h) |
|---|---|---|---|
| Example 2-1 | A | H | 248 |
| Example 2-2 | B | H | >300 |
| Example 2-3 | C | H | >300 |
| Example 2-4 | C | H | >300 |
| Example 2-5 | C | G | 212 |
| Example 2-6 | C | I | 255 |
| Example 2-7 | C | J | 38 |
| Example 2-8 | D | H | >300 |
| Example 2-9 | E | H | >300 |
| Example 2-10 | F | H | >300 |
| Example 2-11 | G | H | 289 |
| Example 2-12 | H | H | 98 |
| Example 2-13 | H | C | 59 |
| Example 2-14 | I | H | 98 |
| Example 2-15 | J | H | 44 |
| Comparative example 2-1 | C | K | 12 |
| Comparative example 2-2 | K | H | 0 |
| Comparative example 2-3 | K | K | 0 |

As described above, the floppy disk and the magnetic head provided with the carbon protective layer have extensively lower running durability compared with the recording mode using the floppy disk or the magnetic head without the carbon protective layer.

Also, when hardness of the carbon protective layer on the magnetic head is 30 GPa or more and hardness of the protective layer of the floppy disk is 20–40 GPa, and hardness of the carbon protective layer on the magnetic head is higher than that of the carbon protective layer of the floppy disk, the better effect can be provided for the improvement of durability.

When a carbon protective layer mainly containing carbon and hydrogen is provided on the magnetic head, and a carbon protective layer mainly containing carbon, hydrogen and nitrogen is provided on the floppy disk, it is evident that higher durability can be achieved.

The carbon protective layer is provided on both the floppy disk and the magnetic head, and high reliability for practical use can be maintained even in case of a floppy disk for high density recording with a magnetic layer made of metal thin film.

What is claimed is:

1. A magnetic disk comprising a magnetic layer, a protective layer, and a lubricating layer coated at least on one surface of a support member, wherein the protective layer contains at least carbon, hydrogen, nitrogen and rare gas elements and wherein the carbon content in the protective layer is 60–70 atom %, the hydrogen content of the protective layer is 25–35 atom %, the nitrogen content of the protective layer is 0.5–8.0 atom %, and the rare gas content in the protective layer is 0.5–1.2 atom %, and wherein said magnetic layer and said protective layer are manufactured by plasma CVD method.

* * * * *